(12) United States Patent
Chang et al.

(10) Patent No.: US 11,312,123 B2
(45) Date of Patent: Apr. 26, 2022

(54) VACUUM LAMINATION SYSTEM AND VACUUM LAMINATION METHOD

(71) Applicant: ELEADTK CO., LTD., Hsinchu County (TW)

(72) Inventors: Ching-Nan Chang, Hsinchu County (TW); Sheng-Yu Lin, Hsinchu County (TW); Ming-Chan Chen, Hsinchu County (TW)

(73) Assignee: ELEADTK CO., LTD., Hsinchu County (TW)

( * ) Notice: Subject to any disclaimer, the term of this patent is extended or adjusted under 35 U.S.C. 154(b) by 0 days.

(21) Appl. No.: 16/924,145

(22) Filed: Jul. 8, 2020

(65) Prior Publication Data

US 2021/0370657 A1 Dec. 2, 2021

(30) Foreign Application Priority Data

May 26, 2020 (TW) .................................. 109117478

(51) Int. Cl.
*B30B 5/02* (2006.01)
*B32B 37/10* (2006.01)
(Continued)

(52) U.S. Cl.
CPC .......... *B32B 37/1018* (2013.01); *B32B 37/06* (2013.01); *B32B 38/0004* (2013.01);
(Continued)

(58) Field of Classification Search
None
See application file for complete search history.

(56) References Cited

U.S. PATENT DOCUMENTS

2009/0255631 A1* 10/2009 Sato ..................... H01J 37/3244
156/345.43
2015/0132967 A1* 5/2015 Urakawa ........... H01J 37/32091
438/714

FOREIGN PATENT DOCUMENTS

CN 102463733 5/2012
CN 210092053 2/2020
(Continued)

OTHER PUBLICATIONS

Machine English translation of TW201220348, May 16, 2012, 25 pages. (Year: 2012).*

(Continued)

*Primary Examiner* — Linda L Gray
(74) *Attorney, Agent, or Firm* — JCIP Global Inc.

(57) ABSTRACT

A vacuum lamination system includes a film supply assembly, a film collection assembly, a lower lamination body, an upper lamination body, an air extractor, a moving assembly and a cutting assembly. The lower lamination body includes a first casing base and a lower heating assembly vertically movable and disposed in the first casing base. The lower heating assembly carries and moves the substrate so that the substrate is substantially flush with a top surface of the first casing base or retracted into the first casing base. The upper lamination body is vertically movable and disposed above the lower lamination body and includes an upper casing and an upper heating assembly disposed on the upper casing. The air extractor is connected to the lower lamination body. The moving assembly changes a height of a portion of the film. The cutting assembly cuts a portion of the film laminated onto the substrate.

11 Claims, 11 Drawing Sheets

(51) Int. Cl.
  *B32B 38/18* (2006.01)
  *B32B 37/06* (2006.01)
  *B32B 38/00* (2006.01)
  *B32B 38/04* (2006.01)

(52) U.S. Cl.
  CPC ............ *B30B 5/02* (2013.01); *B32B 37/1009* (2013.01); *B32B 38/1858* (2013.01); *B32B 2037/109* (2013.01); *B32B 2038/045* (2013.01); *B32B 2309/12* (2013.01); *B32B 2309/68* (2013.01); *Y10T 156/1348* (2015.01)

(56) References Cited

FOREIGN PATENT DOCUMENTS

| | | |
|---|---|---|
| JP | 2009194064 | 8/2009 |
| JP | 2013052424 | 3/2013 |
| TW | 200422165 | 11/2004 |
| TW | 201220348 | 5/2012 |
| TW | I402171 | 7/2013 |
| TW | I402930 | 7/2013 |
| TW | I424518 | 1/2014 |
| TW | I460075 | 11/2014 |
| TW | 201722739 | 7/2017 |
| TW | 201827234 | 8/2018 |

OTHER PUBLICATIONS

"Office Action of Taiwan Counterpart Application", dated Dec. 23, 2020, p. 1-p. 15.
"Office Action of Taiwan Counterpart Application", dated Feb. 25, 2021, p. 1-p. 16.
"Office Action of Japan Counterpart Application", dated Jan. 21, 2022, p. 1-p. 3.

* cited by examiner

VACUUM LAMINATION SYSTEM AND VACUUM LAMINATION METHOD

CROSS-REFERENCE TO RELATED APPLICATION

This application claims the priority benefit of Taiwan application serial no. 109117478, filed on May 26, 2020. The entirety of the above-mentioned patent application is hereby incorporated by reference herein and made a part of this specification.

BACKGROUND

Technical Field

The disclosure relates to a lamination system and a lamination method, and more particularly to a vacuum lamination system and a method thereof.

Description of Related Art

At present, one common lamination method is to use a roller to laminate a film onto a substrate in an atmospheric environment. However, for a substrate having uneven structures on the surface, air bubbles are easily formed between the film and the substrate. Another common lamination method is to first pre-laminate the film on the substrate in an atmospheric environment and then place the substrate and the pre-laminated film on the substrate into a vacuum chamber to perform vacuum lamination.

However, in the process of vacuum lamination, the film is heated and pressurized to attach to the substrate. If air bubbles are formed between the substrate and the pre-laminated film on the substrate, the air bubbles between the substrate and the film cannot be removed even if the vacuum chamber is vacuumized.

SUMMARY

The disclosure provides a vacuum lamination system capable of preventing air bubbles between a film and a substrate.

The disclosure provides a vacuum lamination method capable of preventing air bubbles between a film and a substrate.

A vacuum lamination system of the disclosure, adapted for fixing a film on a substrate, includes a film supply assembly, a film collection assembly, a lower lamination body, an upper lamination body, an air extractor, a moving assembly, and a cutting assembly. The film supply assembly is adapted for providing the film. The film collection assembly is adapted for recycling the film. The lower lamination body is located between the film supply assembly and the film collection assembly and includes a first casing base and a lower heating assembly vertically movable and arranged in the first casing base. The lower heating assembly is adapted for carrying and moving the substrate so that the substrate is flush with a top surface of the first casing base and the substrate protrudes from the top surface of the first casing base or retracts into the first casing base. The upper lamination body is vertically movable and arranged above the lower lamination body and has an upper casing and an upper heating assembly arranged on the upper casing. The air extractor is connected to the lower lamination body. The moving assembly is movably disposed between the film supply assembly and the film collection assembly and is adapted for changing a height of a portion of the film between the lower lamination body and the upper lamination body. The cutting assembly is movably disposed above the lower lamination body and is adapted for cutting a portion of the film laminated onto the substrate.

In an embodiment of the disclosure, the lower lamination body further includes a second casing base vertically movable and disposed under the first casing base, and an airtight flexible assembly arranged between the second casing base and the first casing base. The lower heating assembly moves along with the second casing base.

In an embodiment of the disclosure, the upper lamination body further includes a flexible pad. A periphery of the flexible pad is fixed to the upper casing, the upper heating assembly is located between the upper casing and the flexible pad, the upper casing has an upper hole, and a space between the upper heating assembly and the flexible pad communicates with the upper hole.

In an embodiment of the disclosure, the upper lamination body further includes an upper driving assembly connected to the upper heating assembly to move the upper heating assembly relative to the upper casing.

In an embodiment of the disclosure, the upper lamination body further includes a flexible pad disposed on the upper heating assembly.

In an embodiment of the disclosure, the upper heating assembly includes an upper heat insulation layer and an upper heating layer arranged in sequence, and the upper heating layer is close to the lower lamination body.

In an embodiment of the disclosure, the lower heating assembly includes a lower heating layer and a lower wafer carrier tray arranged in sequence, and the lower wafer carrier tray is close to the upper lamination body.

A vacuum lamination method of the disclosure includes the following steps. A film is disposed to be above a substrate so that a gap is formed between the film and the substrate. Air is extracted between the film and the substrate. The substrate is brought to be close to the film, and the substrate and the film are heated and pressurized. A portion of the film laminated onto the substrate is cut.

In an embodiment of the disclosure, the step of disposing the film to be above the substrate further includes the following steps. A lower lamination body having a first casing base and a lower heating assembly vertically movable and arranged in the first casing base is provided. The substrate is disposed to the lower heating assembly and the lower heating assembly is lowered so that the substrate is lower than a top surface of the first casing base. The film is disposed on the top surface of the first casing base.

In an embodiment of the disclosure, the step of extracting the air between the film and the substrate further includes the following steps. An upper lamination body is lowered onto the first casing base of the lower lamination body to press against an upper surface of the film. Air is extracted between the upper lamination body and the lower lamination body.

In an embodiment of the disclosure, the step of heating and pressurizing the substrate and the film further includes the following steps. The lower heating assembly of the lower lamination body is lifted to bring the substrate close to a lower surface of the film. A flexible pad of the upper lamination body and the lower heating assembly of the lower lamination body heat and pressurize the substrate and the film so that the film is hot pressed onto the substrate.

In an embodiment of the disclosure, after heating and pressurizing the substrate and the film and before cutting the film, the method further includes the following steps. Pressurizing on the substrate and the film is stopped. A negative pressure or vacuum state between the upper lamination body and the lower lamination body is destroyed. The upper lamination body is lifted and the substrate and a portion of the film laminated onto the substrate are exposed.

Based on the above, in the vacuum lamination system and method of the disclosure, the lower heating assembly of the lower lamination body may move vertically relative to the first casing base so that the substrate is almost flush with the top surface of the first casing base or retracts into the first casing base. Therefore, when the film is placed on the top surface of the lower lamination body and the upper lamination body is pressed down to the lower lamination body, the lower heating assembly may be lowered, making the substrate to retract into the first casing base without contacting the film. Meanwhile, the air extractor may extract air from the space between the lower lamination body and the upper lamination body so that the space between the film and the substrate is in a vacuum state. Subsequently, the lower heating assembly and the flexible pad heat and pressurize the film and the substrate to laminate the film onto the substrate. In this way, no air bubbles are formed between the film and the substrate.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION IN THE PRESENT EMBODIMENTS

Figure 1:
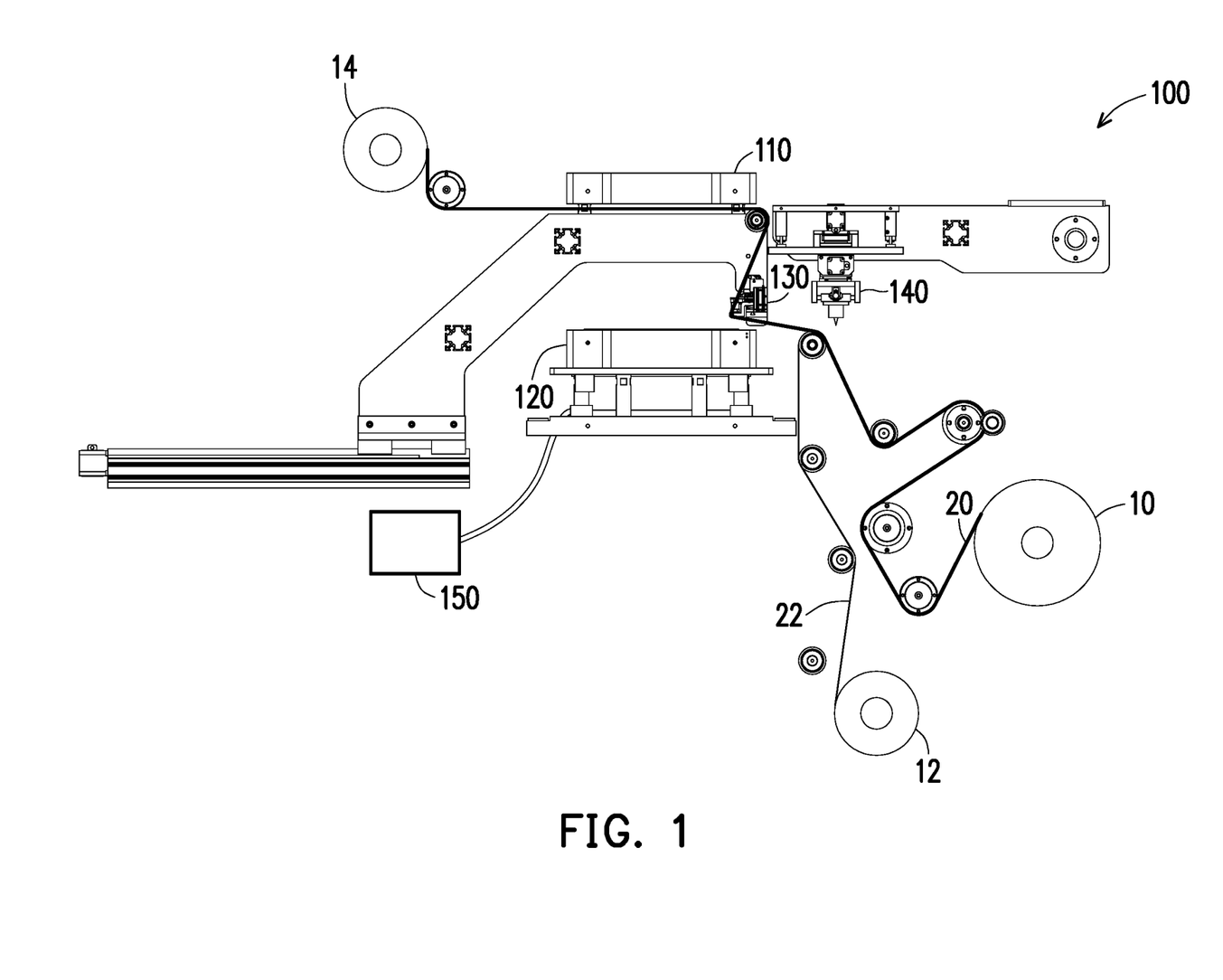
FIG. 1 is a schematic view of a vacuum lamination system according to an embodiment of the disclosure.

FIG. 1 is a schematic view of a vacuum lamination system according to an embodiment of the disclosure. Referring to FIG. 1, in the present embodiment, a vacuum lamination system 100 is suitable for fixing a film 20 on a substrate 30. In the present embodiment, the film 20 is, for example, a photoresist strip made of dry film resists, and the substrate 30 is, for example, a wafer. However, the types of the film 20 and the substrate 30 are not limited thereto. In general, since a plurality of dies or patterns with different heights are disposed on a wafer surface, the wafer surface is uneven, making it difficult for the photoresist to be well laminated to the wafer. In the present embodiment, the vacuum lamination system 100 can laminate the photoresist to the wafer without causing air bubbles between the photoresist and the wafer, which is described below.

As shown in FIG. 1, the vacuum lamination system 100 includes a film supply assembly 10, a film collection assembly 14, a lower lamination body 120, an upper lamination body 110, an air extractor 150, a moving assembly 130, and a cutting assembly 140. The film supply assembly 10 is suitable for providing the film 20. In the present embodiment, initially a protective film 22 is attached to the film 20 to protect the film 20. The film 20 is separated from the protective film 22 before being fed into the lower lamination body 120. The vacuum lamination system 100 further includes a protective film winding wheel 12 for recycling the protective film 22. The film collection assembly 14 is suitable for recycling the unused film 20.

The lower lamination body 120 is located between the film supply assembly 10 and the film collection assembly 14, and the upper lamination body 110 is vertically movable and disposed above the lower lamination body 120. The air extractor 150 is connected to the lower lamination body 120. When the upper lamination body 110 is pressed down to the lower lamination body 120, the air extractor 150 may extract air in the space between the upper lamination body 110 and the lower lamination body 120.

The moving assembly 130 is movable and disposed between the film supply assembly 10 and the film collection assembly 14. The moving assembly 130 includes, for example, two rollers disposed vertically and suitable for winding the film 20, and after the moving assembly 130 moves horizontally, the height of the portion of the film 20 located between the lower lamination body 120 and the upper lamination body 110 is changed.

The cutting assembly 140 is horizontally movable and disposed above the lower lamination body 120 and is suitable for cutting the portion of the film 20 that is laminated onto the substrate 30.

Figure 2A:
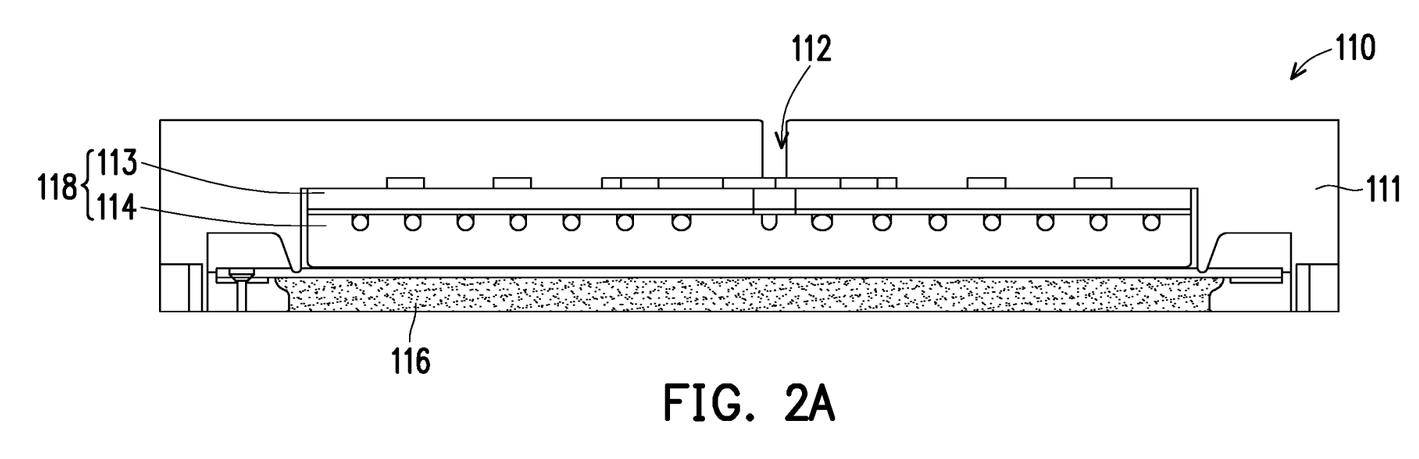
FIG. 2A is a schematic view of an upper lamination body of the vacuum lamination system of FIG. 1.

FIG. 2A is a schematic view of the upper lamination body of the vacuum lamination system of FIG. 1. Referring to FIG. 2A, the upper lamination body 110 includes an upper casing 111 and an upper heating assembly 118 disposed on the upper casing 111. In the present embodiment, the upper heating assembly 118 includes an upper heat insulation layer 113 and an upper heating layer 114 disposed in sequence. The upper heating layer 114 is located in the lower part (i.e., closer to the lower lamination body 120). Of course, the type of the upper heating assembly 118 is not limited thereto.

In the present embodiment, the upper lamination body 110 further includes a flexible pad 116. The periphery of the flexible pad 116 is fixed to the upper casing 111, but the center of the flexible pad 116 is not fixed to the upper casing 111. The upper heating assembly 118 is located between the upper casing 111 and the flexible pad 116. The upper casing 111 has an upper hole 112, and the space between the upper heating assembly 118 and the flexible pad 116 communicates with the upper hole 112.

Figure 2B:
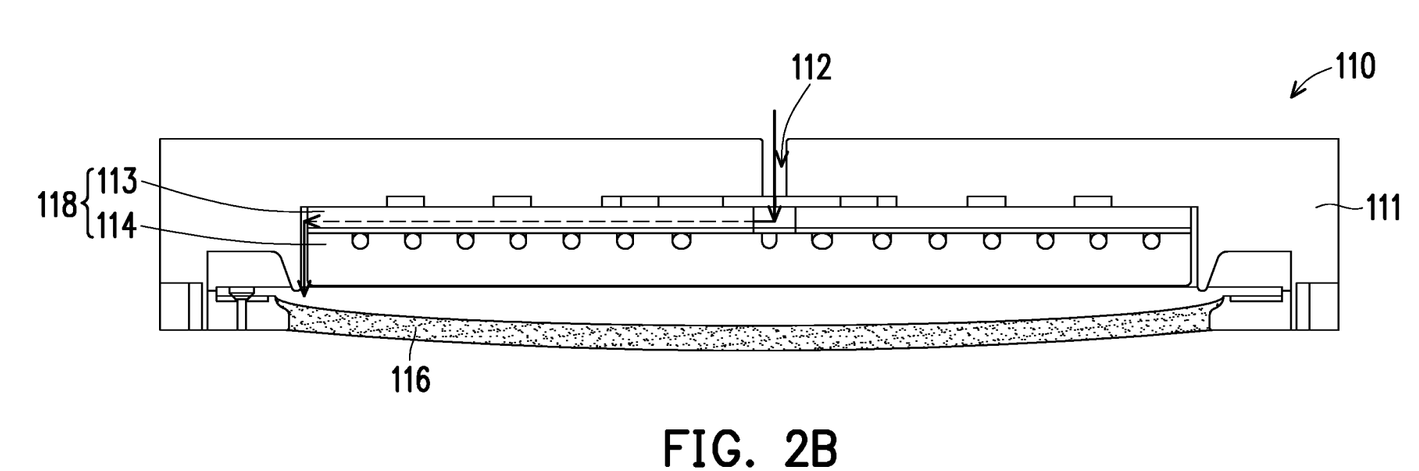
FIG. 2B is a schematic view of the upper lamination body of FIG. 2A when air is provided.

FIG. 2B is a schematic view of the upper lamination body of FIG. 2A when air is provided. Referring to FIG. 2B, when air enters the space between the upper heating assembly 118 and the flexible pad 116 from the upper hole 112, the flexible pad 116, pressed by the air, is projected downward, which can help attach the film 20 to the uneven upper surface of the substrate 30 to laminate to the substrate 30 well.

Figure 3A:
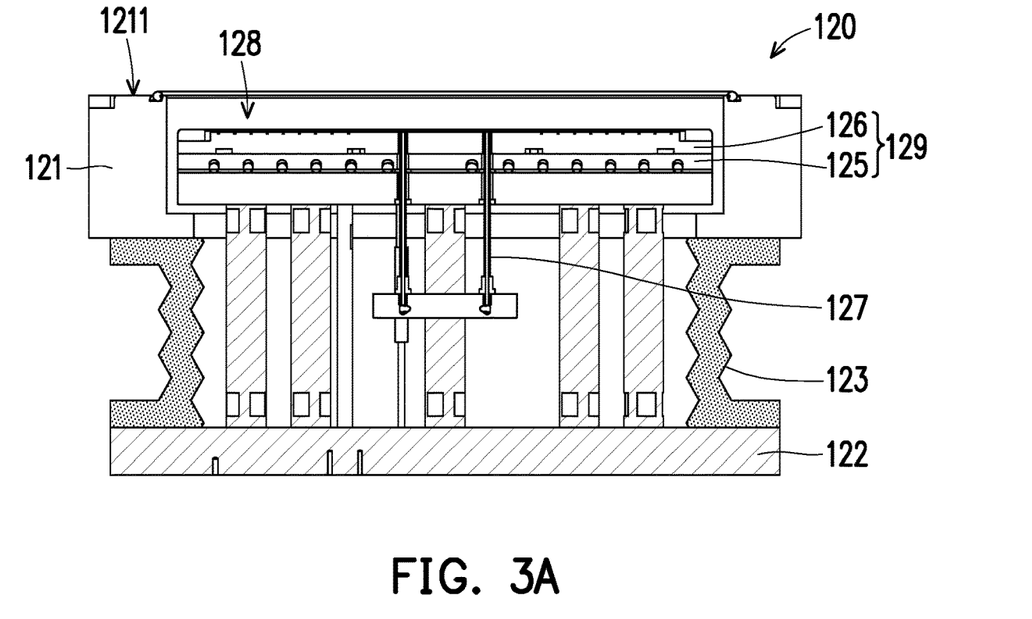
FIG. 3A is a schematic view of a lower lamination body of the vacuum lamination system of FIG. 1.

FIG. 3A is a schematic view of a lower lamination body of the vacuum lamination system of FIG. 1. Referring to FIG. 3A, in the present embodiment, the lower lamination body 120 includes a first casing base 121, a lower heating assembly 129 vertically movable and disposed in a space 128 of the first casing base 121, and pins 127 adjustably protruding from or retracting into the lower heating assembly 129. In the present embodiment, the lower heating assembly 129 includes a lower heating layer 125 and a lower wafer carrier tray 126 disposed in sequence. The lower wafer carrier tray 126 is located in the upper part (i.e., closer to the upper lamination body 110). Of course, the type of the lower heating assembly 129 is not limited thereto.

In the present embodiment, the lower lamination body 120 further includes a second casing base 122 vertically movable and disposed under the first casing base 121 and an airtight flexible assembly 123 disposed between the second casing base 122 and the first casing base 121. The lower heating assembly 129 moves along with the second casing base 122. The second casing base 122, for example, is connected to a motor (not shown) and can move vertically relative to the first casing base 121. The airtight flexible assembly 123 is, for example, a vacuum bellow, which can be shortened and stretched and can maintain airtightness, but the type of the airtight flexible assembly 123 is not limited thereto.

Figure 3B:
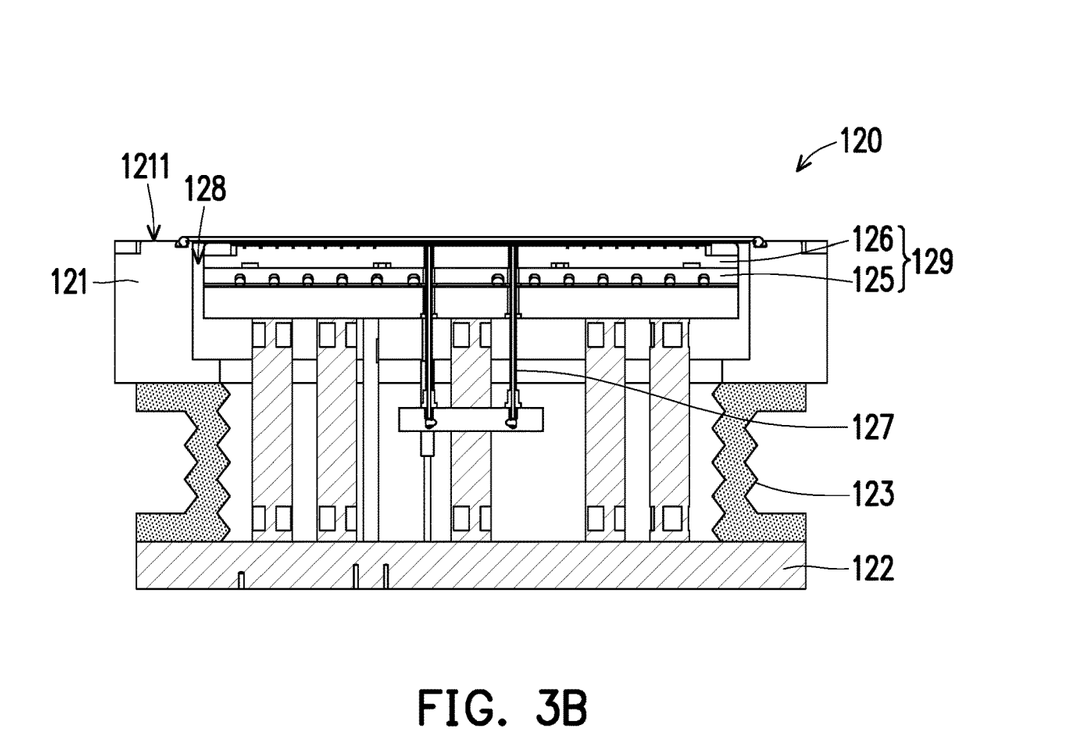
FIG. 3B is a schematic view of a lower heating assembly of FIG. 3A when lifted.

FIG. 3B is a schematic view of the lower heating assembly of FIG. 3A when lifted. Referring to FIG. 3B, in the present embodiment, the second casing base 122 may move upward, the airtight flexible assembly 123 contracts accordingly, and the lower heating assembly 129 moves upward along with the second casing base 122. The lower heating assembly 129 is suitable for supporting the substrate 30 so that the substrate 30 is lifted from a position which retracts into the first casing base 121 (FIG. 3A) to a position which is almost flush with a top surface 1211 of the first casing base 121 (FIG. 3B). The so-called "almost flush position" may be slightly higher than, coplanar with, or slightly lower than the top surface 1211 of the first casing base 121.

Figure 3C:
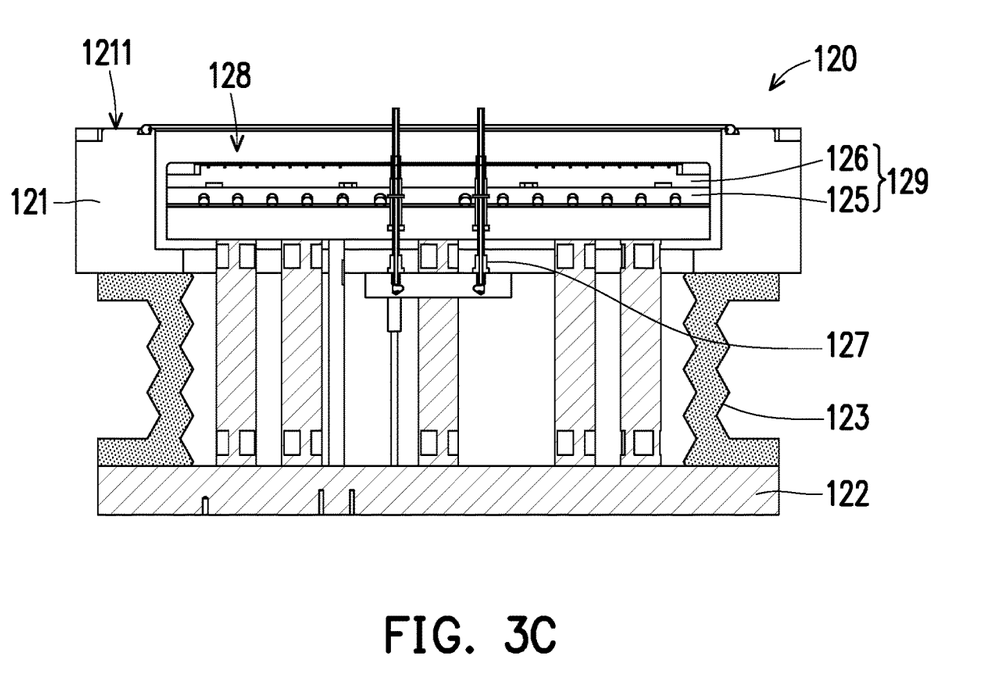
FIG. 3C is a schematic view of pins of FIG. 3A when lifted.

FIG. 3C is a schematic view of the pins of FIG. 3A when lifted. Referring to FIG. 3C, in the present embodiment, the pins 127 may move vertically relative to the lower heating assembly 129 to protrude from or retract into the lower heating assembly 129. In the present embodiment, the pins 127 may protrude from the top surface 1211 of the first casing base 121 to support the substrate 30 or separate the substrate 30 from the lower heating assembly 129.

Figure 4A:
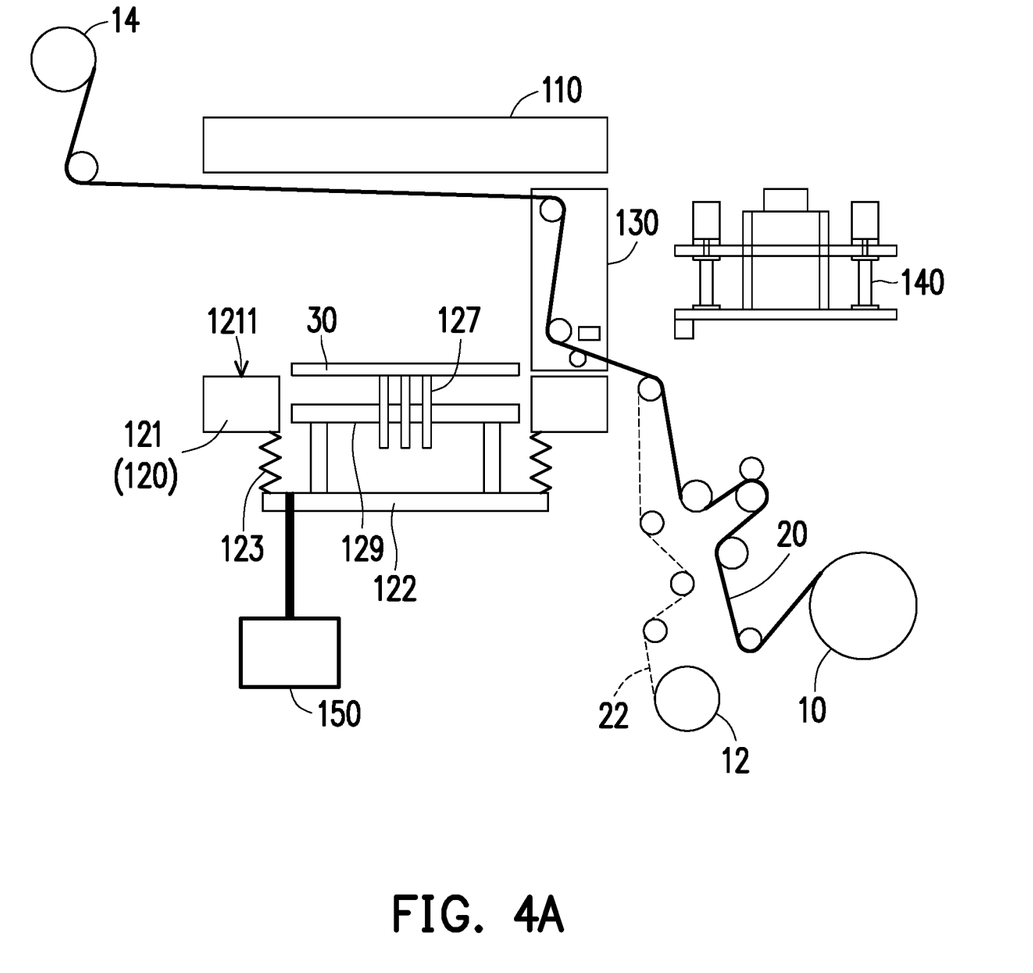
FIGS. 4A to 4F are schematic views of processes of a vacuum lamination method according to an embodiment of the disclosure.

FIGS. 4A to 4F are schematic views of processes of a vacuum lamination method according to an embodiment of the disclosure. Referring to FIG. 4A first, the vacuum lamination method in the present embodiment includes the following steps. First, the pins 127 are protruded from the lower heating assembly 129 and protruded from the top surface 1211 of the first casing base 121. Next, the substrate 30 is disposed onto the pins 127 of the lower lamination body 120.

Figure 4B:
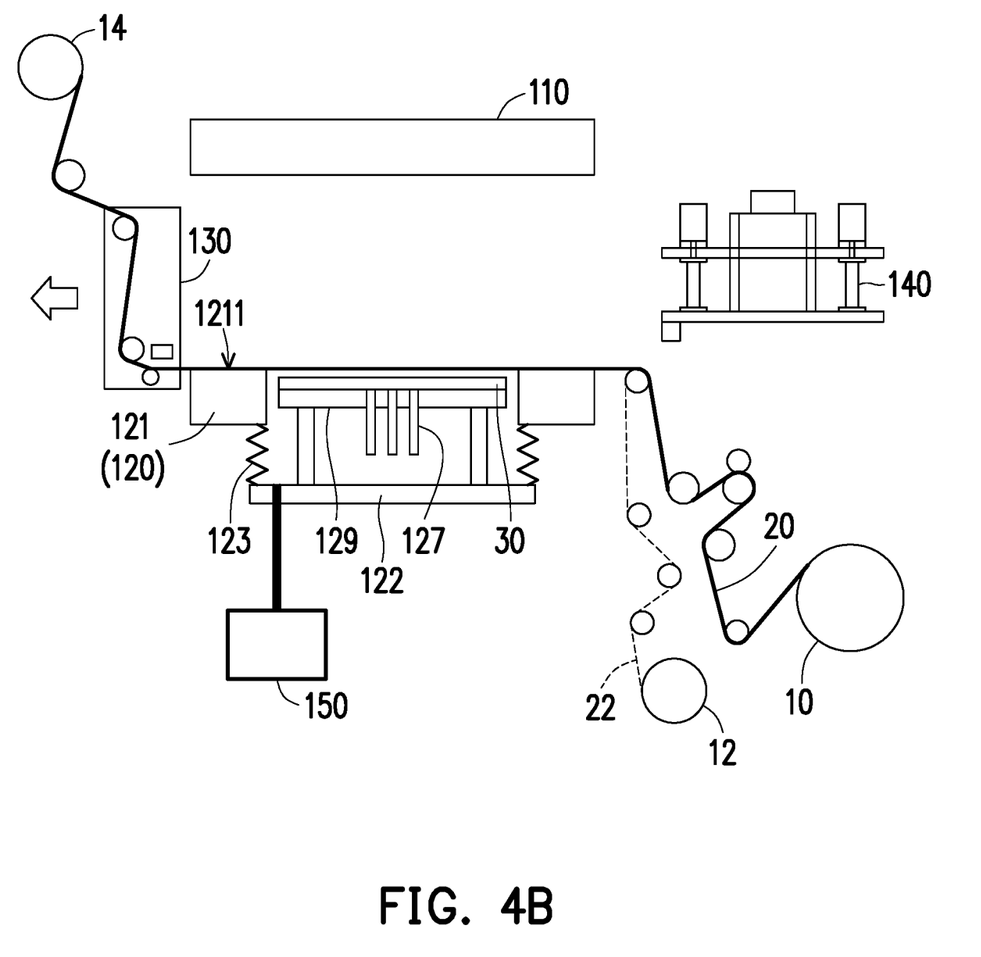

Then, as shown in FIG. 4B, the pins 127 are retracted into the lower heating assembly 129 so that the lower heating assembly 129 supports the substrate 30. Next, the lower heating assembly 129 is lowered so that the substrate 30 is lower than the top surface 1211 of the first casing base 121. Next, the film 20 is disposed above the substrate 30. In the present embodiment, the way to dispose the film 20 to be above the substrate 30 is to move the moving assembly 130 leftward to pass between the upper lamination body 110 and the lower lamination body 120, and after that the film 20 is disposed on the top surface 1211 of the first casing base 121.

Note that as can be seen in FIG. 4B, a gap is formed between the film 20 and the substrate 30. In the present embodiment, since the lower heating assembly 129 can move vertically relative to the first casing base 121, before the film 20 is disposed above the substrate 30, the lower heating assembly 129 may be lowered to prevent the film 20 from contacting the substrate 30 so that a distance between the film 20 and the substrate 30 is maintained.

Figure 4C:
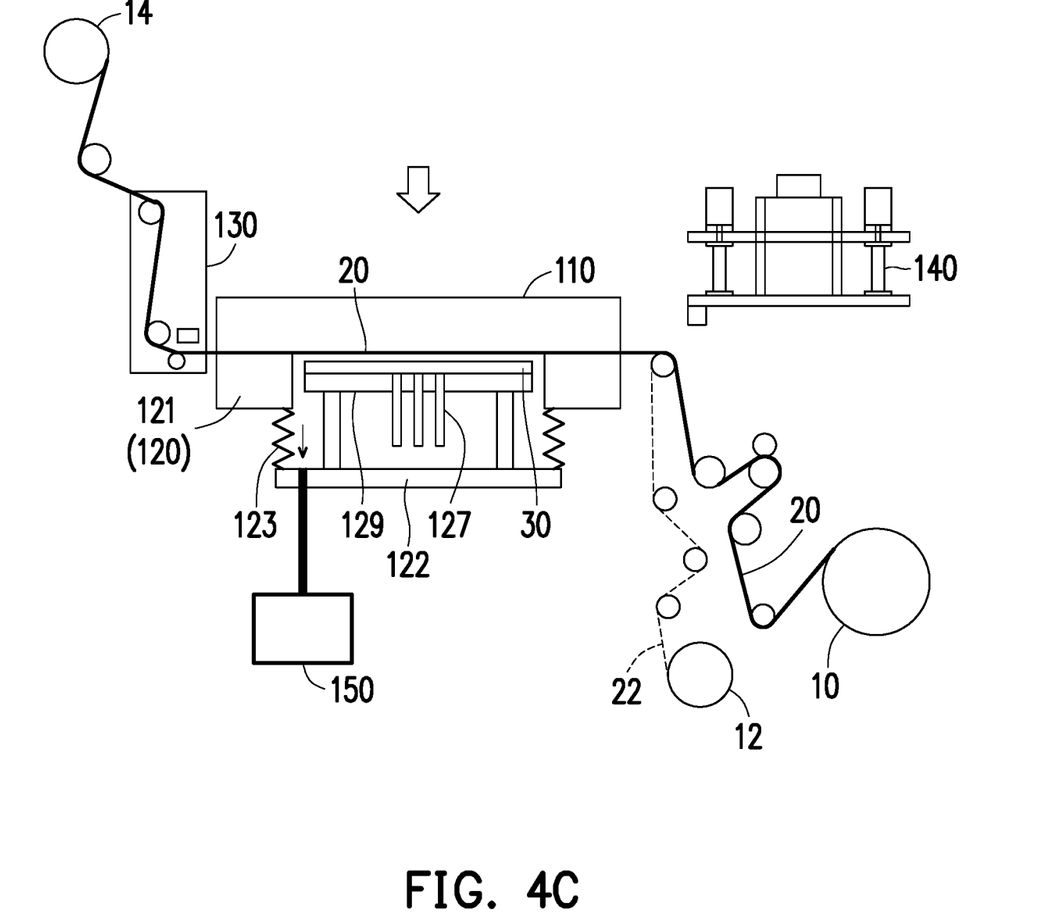

As shown in FIG. 4C, the upper lamination body 110 is lowered to the lower lamination body 120. Meanwhile, the space between the upper lamination body 110 and the lower lamination body 120 is closed. Next, the air between the film 20 and the substrate 30 is extracted. In the present embodiment, the air extractor 150 may vacuumize the chamber between the upper lamination body 110 and the lower lamination body 120 so that the space between the film 20 and the substrate 30 is in a vacuum state.

Figure 4D:
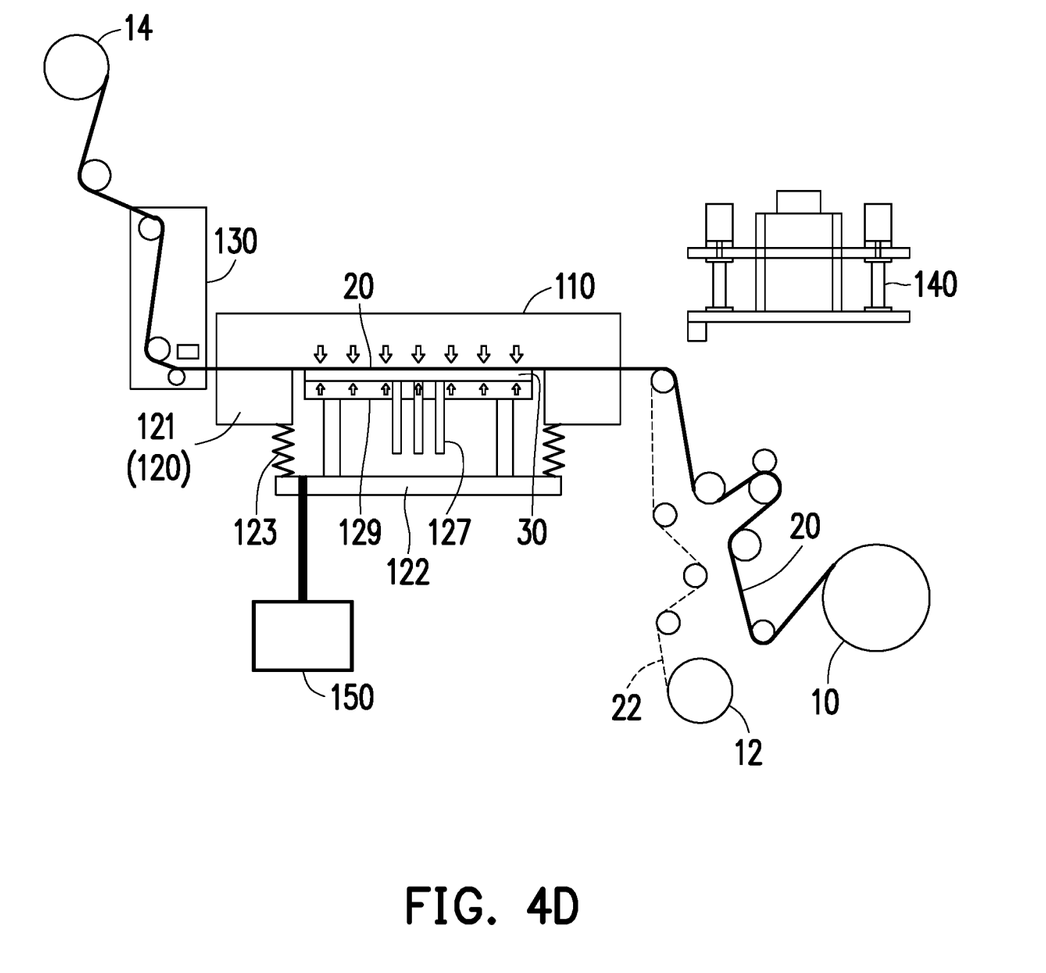

Next, as shown in FIG. 4D, the substrate 30 is brought close to the film 20, and the substrate 30 and the film 20 are heated and pressurized. In the present embodiment, the second casing base 122 is lifted, causing the lower heating assembly 129 to be lifted and subsequently the substrate 30 to be lifted so that the substrate 30 approaches the film 20 for pressurization. Since the air between the film 20 and the substrate 30 has been extracted in the previous step, at this time, after the film 20 is laminated down onto the substrate 30, no air bubbles are found between the film 20 and the substrate 30, which is effective to achieve the effect of no bubbles.

In addition, the flexible pad 116 and the lower heating assembly 129 heat the substrate 30 and the film 20. When air enters the space between the upper heating assembly 118 and the flexible pad 116 from the upper hole 112, the flexible pad 116 is pressed by the air pressure to project downward and pressurize the substrate 30 and the film 20 so that the film 20 is laminated onto the substrate 30.

Figure 4E:
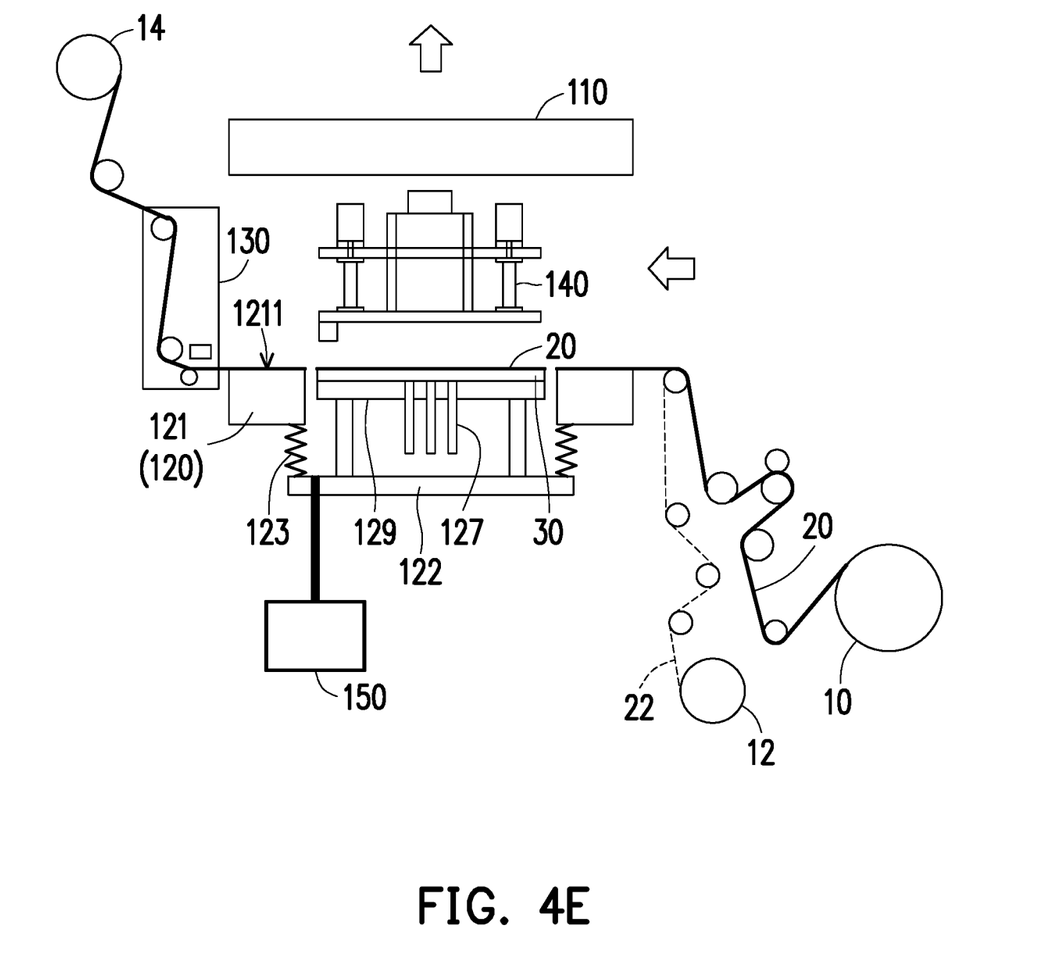

After laminating, pressurizing on the substrate 30 and the film 20 is stopped. Next, as shown in FIG. 4E, the negative pressure or vacuum state between the upper lamination body 110 and the lower lamination body 120 is destroyed. The upper lamination body 110 is lifted, and the portion of the film 20 laminated onto the substrate 30 and the substrate 30 are exposed. Next, the cutting assembly 140 is horizontally moved to a position between the upper lamination body 110 and the lower lamination body 120 to cut the portion of the film 20 laminated onto the substrate 30.

Figure 4F:
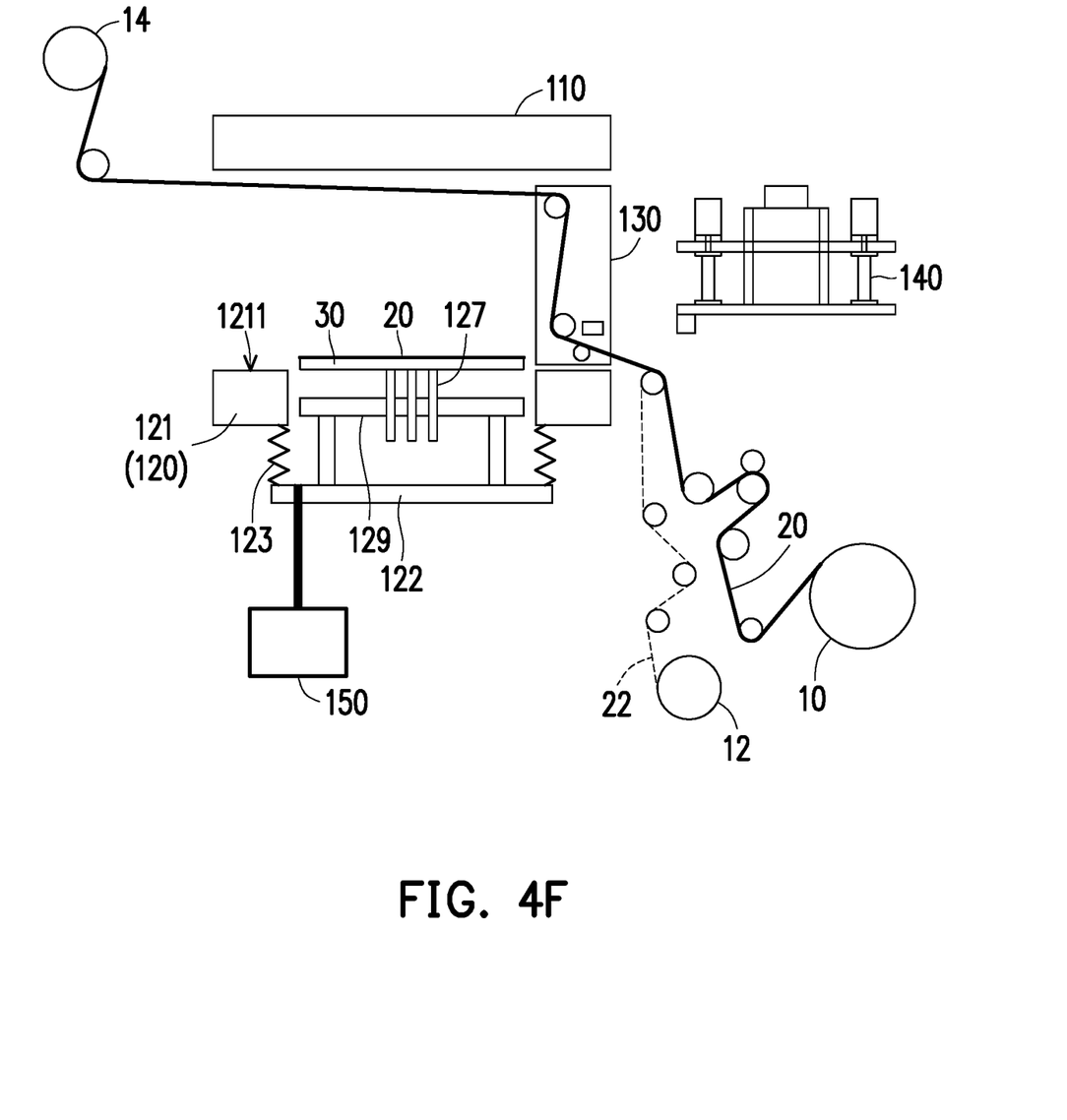

As shown in FIG. 4F, the cutting assembly 140 is moved away from the position between the upper lamination body 110 and the lower lamination body 120, and the moving assembly 130 also moves rightward to return to the original position. Finally, the pins 127 eject the substrate 30 together with the film 20 laminated on the substrate 30 to leave the lower heating assembly 129, and the entire lamination process is finished.

As stated above, in the present embodiment, in order to prevent the film 20 from contacting the substrate 30 before performing the vacuum lamination, or prevent the film 20 from being so close to the substrate 30 that the film 20 is softened by heat and collapses to contact or adhere to the substrate 30 below the film 20, causing air bubbles to be covered therein and unremovable, in the present embodiment, the second casing base 122 and the lower heating assembly 129 can be lowered to take the substrate 30 away from the film 20 first. Then after the chamber between the upper lamination body 110 and the lower lamination body 120 is vacuumized or the air between the film 20 and the substrate 30 is extracted, the second casing base 122 and the lower heating assembly 129 are lifted again so that the substrate is close to the film 20 and then the lamination is performed. In this way, no air bubbles are formed between the film 20 and the substrate 30.

Other embodiments of the upper lamination body will be described below. In the following embodiments, components same as or similar to those in the upper lamination body of FIG. 2A are labeled with the same or similar reference numerals, and only the main differences are described.

Figure 5:
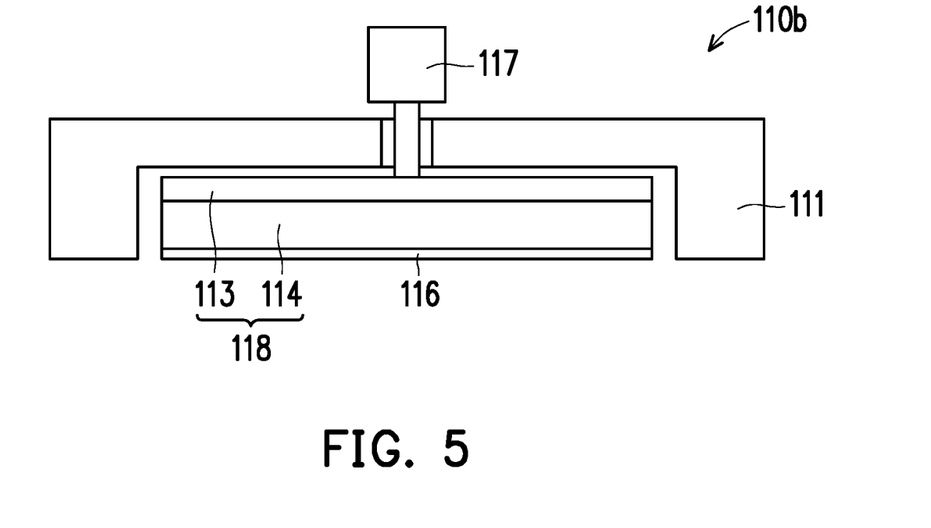
FIG. 5 is a schematic view of an upper lamination body of a vacuum lamination system according to another embodiment of the disclosure.

FIG. 5 is a schematic view of an upper lamination body of a vacuum lamination system according to another embodiment of the disclosure. Referring to FIG. 5, the main difference between the upper lamination body 110b of FIG. 5 and the upper lamination body 110 of FIG. 2A is that the upper lamination body 110b of the present embodiment is not pressurized by air pressure but by mechanical pressure.

In detail, in the present embodiment, the upper lamination body 110b further includes an upper driving assembly 117 connected to the upper heating assembly 118 so that the upper heating assembly 118 moves relative to the upper casing 111. The entire flexible pad 116 is attached to the bottom of the upper heating assembly 118 and is lowered along with the upper heating assembly 118. Since the flexible pad 116, for example, is made of rubber or silicone, it can be compressed. Therefore, the flexible pad 116 still enables the film 20 to well contact the uneven surface of the substrate 30.

Figure 6:
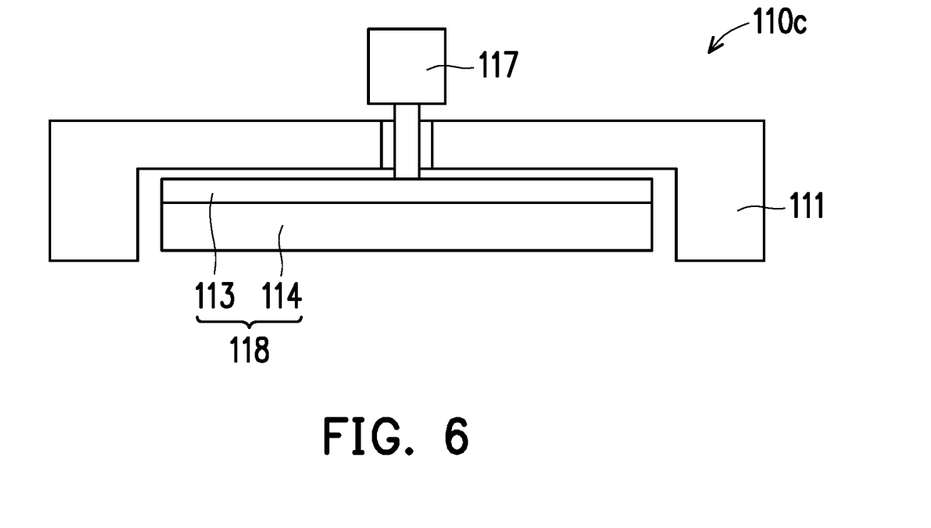
FIG. 6 is a schematic view of an upper lamination body of a vacuum lamination system according to yet still another embodiment of the disclosure.

FIG. 6 is a schematic view of an upper lamination body of a vacuum lamination system according to yet still another embodiment of the disclosure. Referring to FIG. 6, the main difference between the upper lamination body 110c of FIG. 6 and the upper lamination body 110b of FIG. 5 is that in the present embodiment, the upper lamination body 110c is not provided with the flexible pad 116 (labeled in FIG. 5). The upper lamination body 110c in the present embodiment can be applied to directly flatten the surface of the film 20 after laminating the film. The upper heating layer 114 made from hard material may directly contact the film 20. Such a configuration enables the film 20 to well contact the substrate 30 and also enables the surface of the film 20 to stay flat after being laminated.

Based on the above, in the vacuum lamination system and method of the disclosure, the lower heating assembly of the lower lamination body may move vertically relative to the first casing base so that the substrate is almost flush with the top surface of the first casing base or retracts into the first casing base. Therefore, when the film is placed on the top surface of the lower lamination body and the upper lamination body is pressed down to the lower lamination body, the lower heating assembly may be lowered, making the substrate retract into the first casing base without contacting the film. Meanwhile, the air extractor may extract air from the space between the lower lamination body and the upper lamination body so that the space between the film and the substrate is in a vacuum state. Subsequently, the lower heating assembly and the upper heating assembly heat and pressurize the film and the substrate to laminate the film onto the substrate. In this way, no air bubbles are formed between the film and the substrate.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vacuum lamination system, adapted for fixing a film on a substrate, comprising
    a film supply assembly including a roller adapted for providing the film;
    a film collection assembly including a roller adapted for recycling the film;
    a lower lamination body located between the film supply assembly and the film collection assembly and comprising a first casing base and a lower heating assembly vertically movable and arranged in the first casing base, wherein the lower heating assembly comprises a lower heating layer and a lower wafer carrier tray and is adapted for carrying and moving the substrate so that the substrate is flush with a top surface of the first casing base and the substrate protrudes from the top surface of the first casing base or retracts into the first casing base;
    an upper lamination body vertically movable and arranged above the lower lamination body and comprising an upper casing and an upper heating assembly arranged on the upper casing, wherein the upper heating assembly comprises an upper heat insulation layer and an upper heating layer;
    an air extractor connected to the lower lamination body, wherein the lower lamination body further comprises a second casing base vertically movable and disposed under the first casing base, and an airtight flexible assembly being a vacuum bellow and arranged between the second casing base and the first casing base, wherein the lower heating assembly moves along with the second casing base;
    a moving assembly, comprising a roller, movably disposed between the film supply assembly and the film collection assembly and adapted for changing a height of a portion of the film between the lower lamination body and the upper lamination body, and
    a cutting assembly, with a cutter, movably disposed above the lower lamination body and adapted for cutting a portion of the film laminated onto the substrate.

2. The vacuum lamination system of claim 1, wherein the upper lamination body further comprises a flexible pad, a periphery of the flexible pad is fixed to the upper casing, the upper heating assembly is located between the upper casing and the flexible pad, the upper casing has an upper hole, and a space between the upper heating assembly and the flexible pad communicates with the upper hole.

3. The vacuum lamination system of claim 1, wherein the upper lamination body further comprises an upper driving assembly connected to the upper heating assembly to move the upper heating assembly relative to the upper casing.

4. The vacuum lamination system of claim 3, wherein the upper lamination body further comprises a flexible pad disposed on the upper heating assembly.

5. The vacuum lamination system of claim 1, wherein the upper heat insulation layer and the upper heating layer are arranged in sequence, and the upper heating layer is close to the lower lamination body.

6. The vacuum lamination system of claim 1, wherein the lower heating layer and the lower wafer carrier tray are arranged in sequence, and the lower wafer carrier tray is close to the upper lamination body.

7. A vacuum lamination method by using the vacuum lamination system of claim 1, comprising:
    disposing the film to be above the substrate, wherein a gap is formed between the film and the substrate;

extracting air between the film and the substrate;

bringing the substrate to be close to the film and heating and pressurizing the substrate and the film, so that the film is laminated onto the substrate; and cutting a portion of the film that is laminated onto the substrate.

8. The vacuum lamination method of claim 7, wherein the step of disposing the film to be above the substrate further comprises:

disposing the substrate on the lower heating assembly and lowering the lower heating assembly so that the substrate is lower than the top surface of the first casing base; and disposing the film on the top surface of the first casing base.

9. The vacuum lamination method of claim 8, wherein the step of extracting the air between the film and the substrate further comprises:

lowering the upper lamination body onto the first casing base of the lower lamination body to press against an upper surface of the film; and extracting the air between the upper lamination body and the lower lamination body.

10. The vacuum lamination method of claim 9, wherein the step of bringing the substrate to be close to the film and heating and pressurizing the substrate and the film further comprises:

lifting the lower heating assembly of the lower lamination body to bring the substrate close to a lower surface of the film, wherein a flexible pad of the upper lamination body and the lower heating assembly of the lower lamination body heat and pressurize the substrate and the film, so that the film is hot pressed onto the substrate.

11. The vacuum lamination method of claim 9, wherein after heating and pressurizing the substrate and the film and before cutting the film, the method further comprises:

stopping pressurizing the substrate and the film;

destroying a negative pressure or vacuum state between the upper lamination body and the lower lamination body; and lifting the upper lamination body and exposing the substrate and the portion of the film that is laminated onto the substrate.

\* \* \* \* \*